United States Patent
Machani et al.

(10) Patent No.: US 9,461,821 B1
(45) Date of Patent: Oct. 4, 2016

(54) SYSTEM AND METHOD FOR KEY MATERIAL PROTECTION ON DEVICES USING A SECRET SHARING SCHEME

(71) Applicant: EMC Corporation, Hopkinton, MA (US)

(72) Inventors: Salah Machani, Thornhill, CA (US); Nikolaos Triandopoulos, Arlington, MA (US); Kevin D. Bowers, Melrose, MA (US); Todd A. Morneau, Sudbury, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 14/319,276

(22) Filed: Jun. 30, 2014

(51) Int. Cl.
*H04L 9/08* (2006.01)
*H04L 9/32* (2006.01)

(52) U.S. Cl.
CPC ............... *H04L 9/085* (2013.01); *H04L 9/32* (2013.01); *H04L 9/0891* (2013.01); *H04L 2209/24* (2013.01)

(58) Field of Classification Search
CPC .............................. H04L 9/085; H04L 9/0891
See application file for complete search history.

(56) References Cited

U.S. PATENT DOCUMENTS

| | | | | |
|---|---|---|---|---|
| 5,625,692 | A * | 4/1997 | Herzberg | H04L 9/085 380/286 |
| 7,664,268 | B1 * | 2/2010 | Eskicioglu | H04N 7/165 380/200 |
| 9,008,311 | B2 * | 4/2015 | Dolev | H04L 9/0822 380/1 |
| 2002/0164033 | A1 * | 11/2002 | Rajasekaran | H04L 9/085 380/278 |
| 2006/0026423 | A1 * | 2/2006 | Bangerter | H04L 9/3218 713/164 |
| 2008/0205637 | A1 * | 8/2008 | Kurihara | H04L 9/085 380/28 |
| 2008/0232580 | A1 * | 9/2008 | Hosaka | H04L 9/085 380/28 |
| 2009/0077379 | A1 * | 3/2009 | Geyzel | H04L 9/085 713/170 |
| 2011/0280404 | A1 * | 11/2011 | Jennas, II | H04L 9/085 380/278 |
| 2012/0198241 | A1 * | 8/2012 | O'Hare | G06F 21/602 713/189 |
| 2012/0254619 | A1 * | 10/2012 | Dhuse | H04L 9/085 713/186 |
| 2012/0255030 | A1 * | 10/2012 | Matsuo | H04L 9/085 726/26 |
| 2012/0290830 | A1 * | 11/2012 | Resch | H04L 9/3093 713/150 |
| 2013/0212393 | A1 * | 8/2013 | D'Souza | H04L 9/085 713/171 |
| 2013/0246812 | A1 * | 9/2013 | Resch | G06F 21/6218 713/193 |
| 2013/0272521 | A1 * | 10/2013 | Kipnis | H04L 9/085 380/44 |
| 2013/0282782 | A1 * | 10/2013 | Matsuo | G06F 17/10 708/250 |
| 2014/0173270 | A1 * | 6/2014 | Matsuo | H04L 9/0869 713/150 |

OTHER PUBLICATIONS

The Magic of XOR; Retrieved from http://www.cs.umd.edu/class/sum2003/cmsc311/Notes/BitOp/xor.html on Sep. 4, 2015.*

* cited by examiner

*Primary Examiner* — James Turchen
(74) *Attorney, Agent, or Firm* — Ryan, Mason & Lewis, LLP

(57) ABSTRACT

Encryption key(s) and/or other protected material are protected on devices. A secret splitting scheme is applied to a secret, S, that protects at least one data item to obtain a plurality of secret shares. At least one secret share is encrypted to provide at least one encrypted secret share using an encryption scheme that uses at least one other secret share as the encryption key. A subset of the plurality of secret shares and encrypted secret share(s) is required to reconstruct the secret, S. One or more secret shares and/or encrypted secret shares are provided to at least one device, for example, based on a corresponding key-release policy, to allow access to the data item(s) secured by the secret, S. The secret, S, comprises, for example, a secret key used to protect at least one content item and/or a key used to protect one or more of a content container and a vault storing one or more protected data items.

25 Claims, 7 Drawing Sheets

ANY TWO SHARES CAN REPRODUCE S:

$s1 \oplus s2 = S$      $s1 \oplus s4 = S$
$s2 \oplus s3 = S$      $s2 \oplus s4 = S$
$s1 \oplus s3 = S$      $s3 \oplus s4 = S$

300

310 — WRAP s2 WITH s1 AND DISCARD s2 ⇒ s2' = E(s1, s2)
320 — WRAP s4 WITH s3 AND DISCARD s4 ⇒ s4' = E(s3, s4)

⇓

NEW SET OF SHARES 330 (s1, s2', s3, s4')

SUBSET 340 — SHARE PAIRS
THAT CAN REPRODUCE S s1 ⊕ s2' = S
s1 ⊕ s3 = S
s3 ⊕ s4' = S

SUBSET 350 — SHARE PAIRS
THAT CANNOT REPRODUCE S s1 ⊕ s4' = ⊥
s2' ⊕ s4' = ⊥
s2' ⊕ s3 = ⊥

|  | s1 | s2' | s3 | s4' |
|---|---|---|---|---|
| s1 | – | S | S | ⊥ |
| s2' | S | – | ⊥ | ⊥ |
| s3 | S | ⊥ | – | S |
| s4' | ⊥ | ⊥ | S | – |

SYSTEM AND METHOD FOR KEY MATERIAL PROTECTION ON DEVICES USING A SECRET SHARING SCHEME

FIELD

The present invention relates to the protection of secret keys in devices.

BACKGROUND

Application developers must protect sensitive content on devices where access to an embedded, pluggable or external hardware secure element is not feasible. Developers have limited options to ensure the protection of their sensitive content. Typical methods either rely on the native platform protection mechanisms, such as an application sandbox for separating running programs, combined with optional encryption under a global disk encryption key or derive an encryption key from a weak user personal identification number (PIN) or password.

For example, in a Mobile Device Management (MDM) and Mobile Application Management (MAM) system, an application container on a mobile device is managed remotely by the MDM/MAM server to protect the mobile application data both at rest and in transit. The data encryption keys are typically stored on the device using weak passwords. Another example is a Password Vault or Password Manager application that stores encrypted user passwords on the device, which typically uses a master password scheme. In such cases, should a single device application get compromised by an attacker, the underlying encryption or data protection key gets leaked, and the data contents of the device are exposed to the attacker.

A need therefore exists for new techniques for protecting the encryption key(s) on devices, such as mobile devices. A further need exists for new techniques for protecting content encryption keys against a direct application compromise by an attacker.

SUMMARY

Illustrative embodiments of the present invention provide techniques for protecting encryption key(s) and other protected material on devices, such as mobile devices. According to one aspect of the invention, an exemplary method comprises the steps of: obtaining a secret, S, that protects at least one data item; applying a secret splitting scheme (such as Shamir's polynomial secret sharing scheme) to the secret, S, to obtain a plurality of secret shares; encrypting at least one of the plurality of secret shares to provide at least one encrypted secret share using an encryption scheme that uses at least one other of the plurality of secret shares as the encryption key, wherein a subset of the plurality of secret shares and the at least one encrypted secret share is required to reconstruct the secret, S; and providing one or more of the plurality of secret shares and the at least one encrypted secret share to at least one device to allow access to the at least one data item secured by the secret, S. The at least one encrypted secret share is optionally provided only in encrypted form. One or more of the provided plurality of secret shares and the at least one encrypted secret share is optionally protected with user credentials, e.g., provided by the user or an authentication device.

In one exemplary embodiment, the secret, S, comprises a key used to protect one or more of a content container and a vault storing one or more protected data items. The provided secret share(s) and encrypted secret share(s) are optionally stored in one or more key stores on one or more different devices. The provided secret share(s) and encrypted secret share(s) are optionally released based on a corresponding key-release policy.

In another exemplary embodiment, the secret, S, comprises a secret key used to protect at least one content item. The plurality of secret share(s) and encrypted secret share(s) can be provided to a corresponding Content Provider server, Identity Provider server, Content Provider application executing on a user device and Identity Provider application executing on the user device. Exemplary offline and online processes for reconstructing and recovering the secret, S, are also provided.

Embodiments of the invention can be implemented in a wide variety of different devices for the protection of key material or other protected material using a secret sharing scheme.

DETAILED DESCRIPTION

Illustrative embodiments of the present invention will be described herein with reference to exemplary communication systems and associated servers, clients and other processing devices. It is to be appreciated, however, that the invention is not restricted to use with the particular illustrative system and device configurations shown. As will be described, the present invention in one or more illustrative embodiments provides systems and methods for key material protection on devices using a secret sharing scheme. The disclosed methods can be applied, for example, to key encryption keys (KEKs), Data Encryption Keys (DEKs) or any other secrets or key material used for the protection of sensitive content. While the present invention is illustrated herein primarily in the context of mobile devices, aspects of the present invention can be applied to protect secret keys in any device, as would be apparent to a person of ordinary skill in the art.

One exemplary aspect of the present invention protects secret-key materials on one or more devices by leveraging distributed key-management and access-control methodologies in a technique that is based on a combination of the cryptographic solutions of secret-sharing and key-wrapping (encryption).

Another aspect of the invention provides an extended key-management framework for protecting secret materials via the disclosed secret-sharing and key-wrapping solution associated with an access structure, where the secret shares and/or the wrapped secret shares themselves are further protected through access-control policies. As discussed hereinafter, in the exemplary framework, the novel combination of secret sharing with key wrapping can express both more refined access structures for secret reconstruction and more elaborate access-control policies for releasing stored shares or wrapped shares of the secret. In one exemplary embodiment a set of key stores are employed each having a corresponding key share-release policy, where both the access structure and the key share-release policy are additionally controlled via key wrapping.

Figure 1:
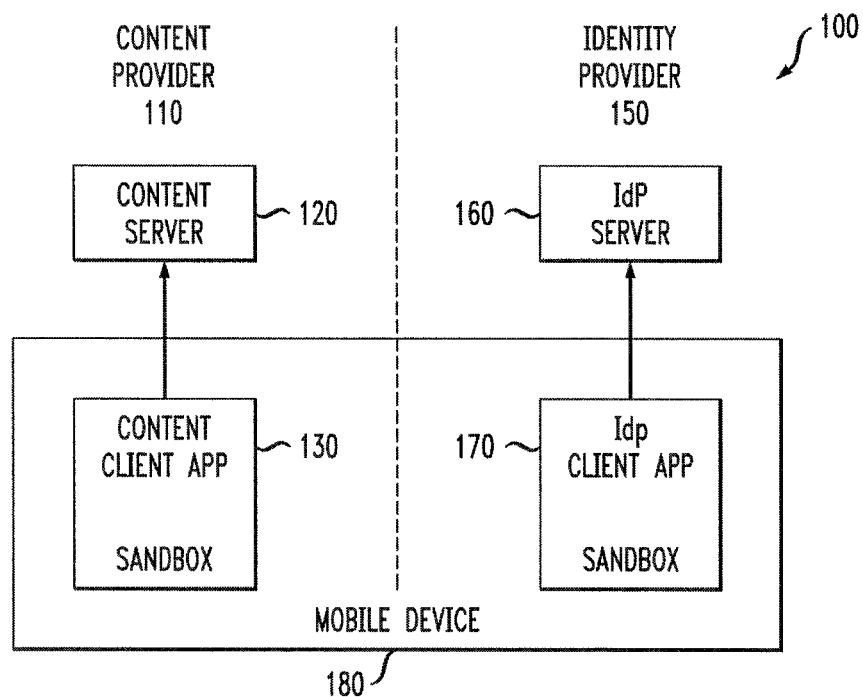
FIG. 1 illustrates an exemplary network environment in which the present invention may be employed.

FIG. 1 illustrates an exemplary network environment 100 in which the present invention may be employed. In one exemplary embodiment of the invention, an additional authentication layer is provided for accessing and managing contents in a device, such as a mobile device. A Content Provider (CP) subsystem is responsible for producing content stored and accessed in the device and an Identity Provider (IdP) subsystem is employed that is responsible for Authentication and Key Management (AKM). In this manner, the Content Provider delegates user authentication to a trusted Identity Provider and retrieves a secret key to unlock a content container. The IdP subsystem is employed as an additional authenticator: Contents can be accessed only if the IdP system is queried by the Content Provider and, in turn, the IdP subsystem authenticates the request and reveals some secret information that is necessary for the CP to access the encrypted data.

The exemplary network environment 100 of FIG. 1 enhances the operability of the system for both offline and online modes of operations. As shown in FIG. 1, an exemplary Content Provider 110 comprises a Content Client (CC) application (app) 130 running on a mobile device 180 and a Content Server (CS) 120 and/or a Proxy Server communicating over a network. Similarly, the Identity Provider (IdP) 150 comprises an IdP Client app 170 running on the mobile device 180 and the IdP Server 160 in the network.

Typically, the CC app 130 and the IdP app 170 run on the same device 180, but they may be on two different devices communicating using a communication channel, as would be apparent to a person of ordinary skill in the art. When the two apps 130, 170 are installed on the same device 180, their processes often run in different sandboxes of the operating system (OS) in a way that no one app process can access the data of another app. The CC app 130 may be a standalone app or a wrapped app sharing data and authentication sessions with other wrapped apps in an Enterprise application container. The Content Server 120 and the IdP server 160 must be isolated and may be managed by independent parties. The IdP server 160 can be component of a larger system offering other security services in the cloud or at the Enterprise network.

Given the above four administratively distinct software modules 120, 130, 160, 170, another aspect of the invention applies the principle of secret splitting for the underlying content-protection secret, S, so that S is not stored in its entirety but rather, is stored and reconstructed through two or more shares that are distributed amongst the four modules 120, 130, 160, 170. In one exemplary implementation, a secret splitting scheme is employed, such as Shamir's polynomial secret sharing scheme. See, for example, Adi Shamir, "How to Share a Secret", Communications of the ACM, Vol. 22, No. 11, 612-13, (1979) (doi:10.1145/359168.359176), incorporated by reference herein.

Figure 2:
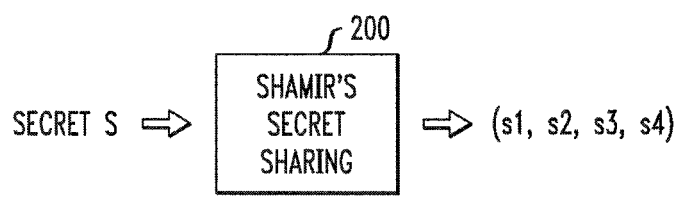
FIG. 2 illustrates an exemplary conventional secret sharing technique in which a polynomial secret sharing scheme is applied to a secret, S, to produce a plurality of secret shares.

FIG. 2 illustrates an exemplary conventional secret sharing technique 200 in which Shamir's polynomial secret sharing scheme is applied to a Secret, S, to produce four secret shares s1, s2, s3, s4. As shown in FIG. 2, any two shares can reproduce S.

Figures 3, 4:
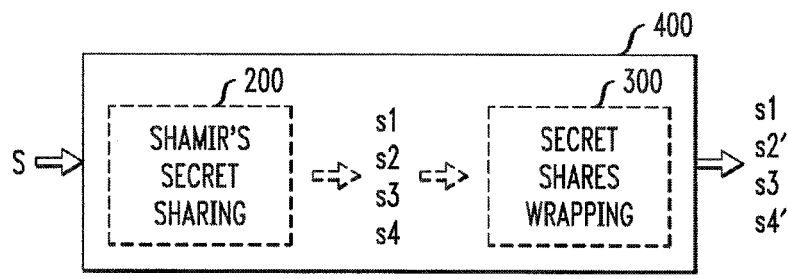
FIG. 3 illustrates an exemplary wrapping process of the secret shares of FIG. 2 with other shares for restricted access control.
FIG. 4 illustrates the exemplary hybrid secret-splitting method, incorporating aspects of the present invention.

According to another aspect of the invention, a hybrid secret-splitting method is employed in order to achieve selective secret-reconstruction capabilities to implement an arbitrary, but not threshold, access structure. FIG. 3 illustrates an exemplary wrapping process 300 of Shamir's shares s1, s2, s3, s4 of the secret, S, with other shares for restricted access control. For example, during a first step 310, share s2 is wrapped with share s1, and share s2 is discarded, to produce modified share s2'. During a second step 320, share s4 is wrapped with share s3, and share s4 is discarded, to produce modified share s4'. Thus, following the wrapping process 300, a new set 330 of shares comprises s1, s2', s3 and s4'. A subset 340 of share pairs of the set 330 can reproduce the secret, S, while a different subset 350 of share pairs of the set 330 cannot reproduce the secret, S.

In the exemplary notation of FIG. 3, E(s1, s2) indicates a wrapping of secret share s2 with the secret share s1. It is noted that since shares s1 and s2 come from the same domain, an appropriate cryptographic hash function may need be used to change the domain of the encryption key as needed, depending on the encryption scheme E(,) in use.

FIG. 4 illustrates the exemplary hybrid secret-splitting method 400, where Shamir's secret sharing technique 200 is applied to a Secret, S, to produce four secret shares s1, s2, s3, s4, and then the wrapping process 300 is applied to the four shares s1, s2, s3, s4 to produce a modified set of shares s1, s2', s3 and s4'. FIG. 4 also illustrates a table 450 indicating valid secret share pairs (i.e., the share combinations that can reconstruct the original secret), where an entry of "S" indicates that the corresponding combination of shares can produce the secret and an entry of "⊥" indicates that the corresponding combination of shares cannot produce the secret.

Aspects of the present invention recognize that the modified set of shares s1, s2', s3 and s4' can be distributed to the four distinct software modules 120, 130, 160, 170 of FIG. 1 for restricted access control. The exemplary scheme is designed so that the IdP system 150 does not have access to the secret, S, and only the CP system 110 can reconstruct the secret to decrypt protected content. In addition to providing a solution protecting content confidentiality against single-application compromise attacks, the disclosed secret splitting scheme combines the efficiency and simplicity of threshold secret sharing systems with the flexibility and generality of explicit key-wrapping access control systems.

Figure 5:
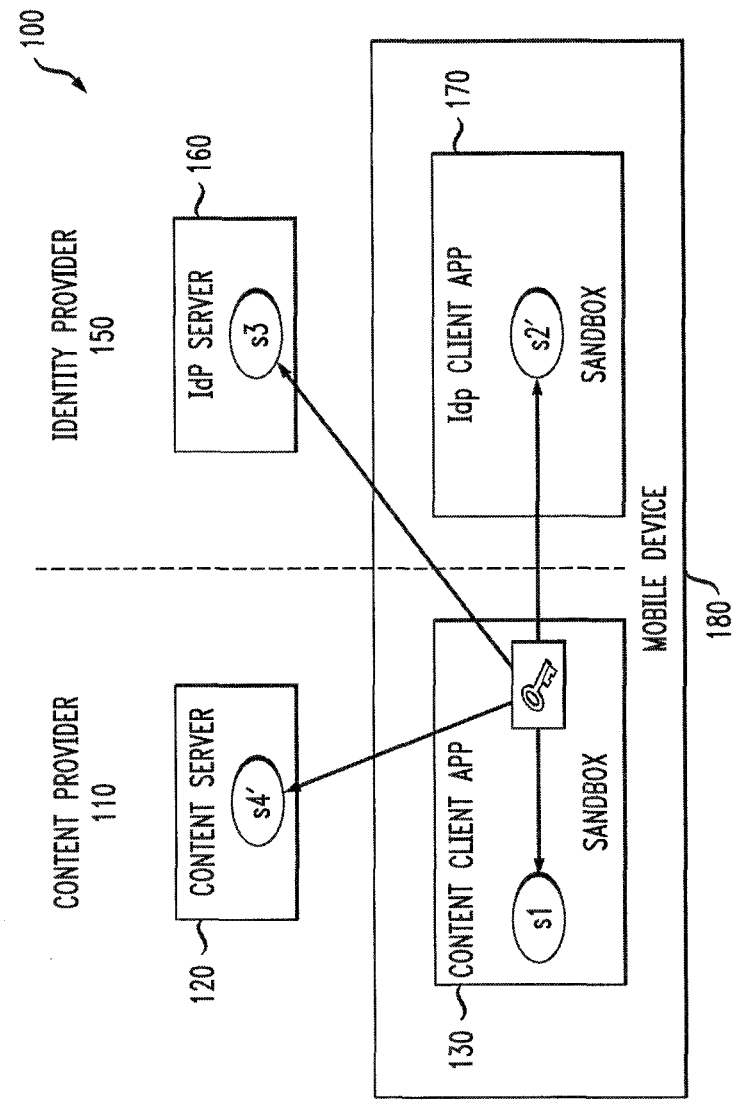
FIG. 5 illustrates the exemplary network environment of FIG. 1 in further detail, where the modified set of shares from FIG. 4 are distributed to protect a secret key S used to protect sensitive content.

FIG. 5 illustrates the exemplary network environment 100, where the modified set of shares s1, s2', s3 and s4' has been distributed to the four distinct software modules 120, 130, 160, 170 of FIG. 1, to protect a secret key S used by the Content Client app 130 to protect sensitive content on the device 180. As noted above, the secret key S can be any encryption key, such as a key encryption key (KEK) or a data encryption key (DEK). The secret key S can be generated, for example, by the Content Client app 130 or the IdP client app 170. If the secret key S is generated by the Content Client app 130, only the Content Provider 110 has access to the secret, S. The secret, S, is then split into four shares, s1, s2, s3, s4, using the exemplary secret sharing technique 200 of FIG. 2, in such a way that any two shares out of the four shares are needed to reconstruct the secret, S. To protect access to the shares and ensure that only the Content Provider 110 will have access to two shares, the exemplary Content Client app 130 employs the exemplary wrapping process 300 of FIG. 3 to wrap share s2 with share s1 and discard share s2, to produce modified share s2'; and to wrap share s4 with share s3 and discard share s4, to produce modified share s4'.

The exemplary Content Client app 130 then distributes the modified shares s1, s2', s3 and s4' for storage as follows:
  Content Server 120 stores s4';
  Content Client app 130 stores s1;
  IdP Server 160 stores s3; and
  IdP Client app 170 stores s2'.

In this manner, only the Content Client app 130 can produce the secret, S, by requesting s2' from IdP Client app 170 (s1⊕s2'=S) or s3 from the IdP Server 160 and s4' from Content Server 120 (s3⊕s4'=S). Thus, [s1, s2'] can be used to generate the secret, S, when the device 180 is in an offline mode or an online mode, as discussed further below in conjunction with FIG. 6. Reconstruction using [s3, s4'] requires that the device 180 is online in order that these shares can be obtained by the device 180 from the IdP Server 160 and the Content Server (CS) 120, as discussed further below in conjunction with FIG. 7. Typically, the Content Client app 130 sends a request to the IdP Client app 170; the IdP Client app 170 authenticates the user and returns s2'. The Content Client app 130 uses its local s1 share to unwrap s2' and the second share s2 and produces the secret, S.

It is further noted that the Content Server 120 and Content Client app 130 cannot construct the secret without the collaboration of the Identity Provider (IdP) 150 (s1⊕s4'=1). Likewise, the IdP Server 160 and IdP Client app 170 cannot construct the secret without collaboration with Content Provider 110 (s2'⊕s3=1).

Figure 6:
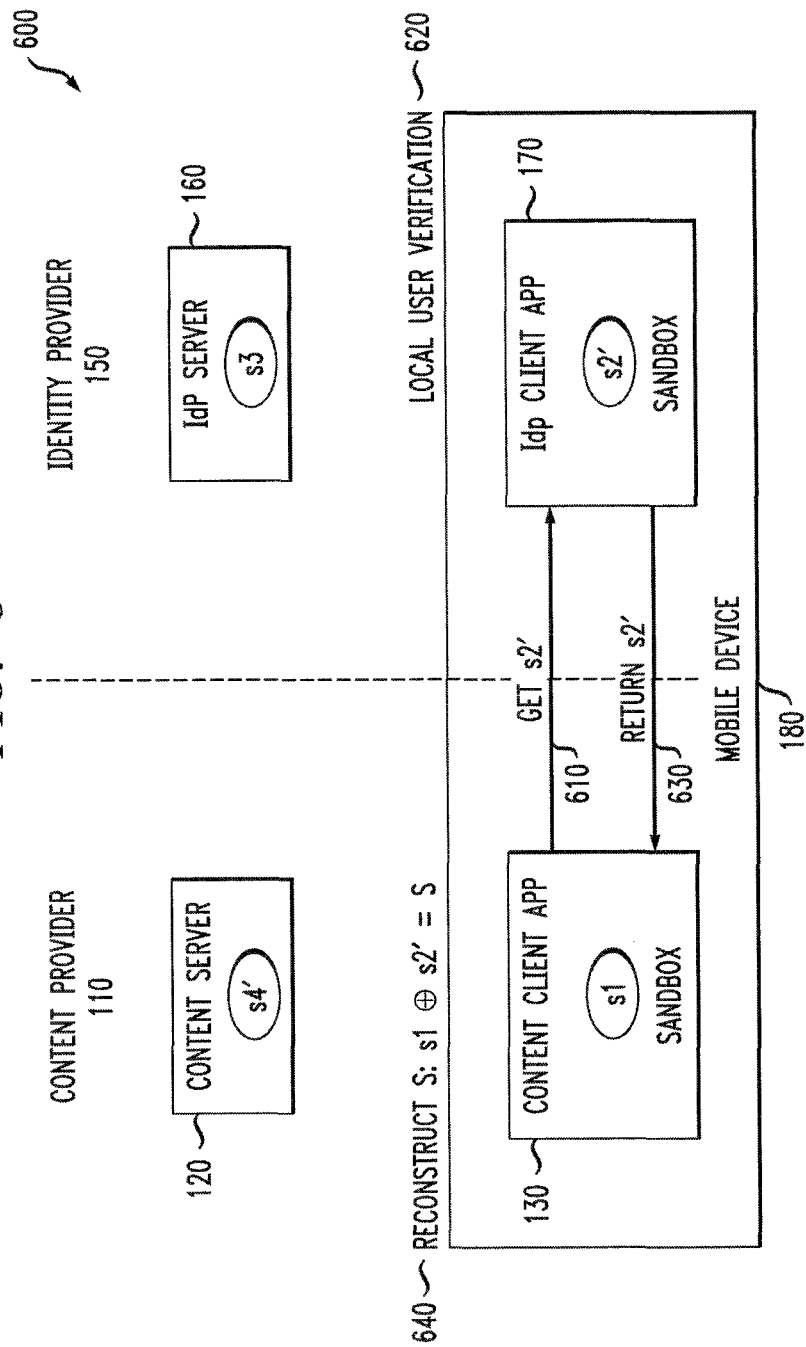
FIGS. 6 and 7 illustrate an offline and online process, respectively, for reconstructing the secret, S.

FIG. 6 illustrates an offline process 600 for reconstructing the secret, S, using shares [s1, s2']. As shown in FIG. 6, the Content Client app 130 initially sends a request to the IdP Client app 170 during step 610 to obtain s2'. The IdP Client app 170 then performs a local user verification during step 620. Once the user is verified, the IdP Client app 170 returns s2' to the Content Client app 130 during step 630. The Content Client app 130 then reconstructs S during step 640 (s1⊕s2'=S).

Figure 7:
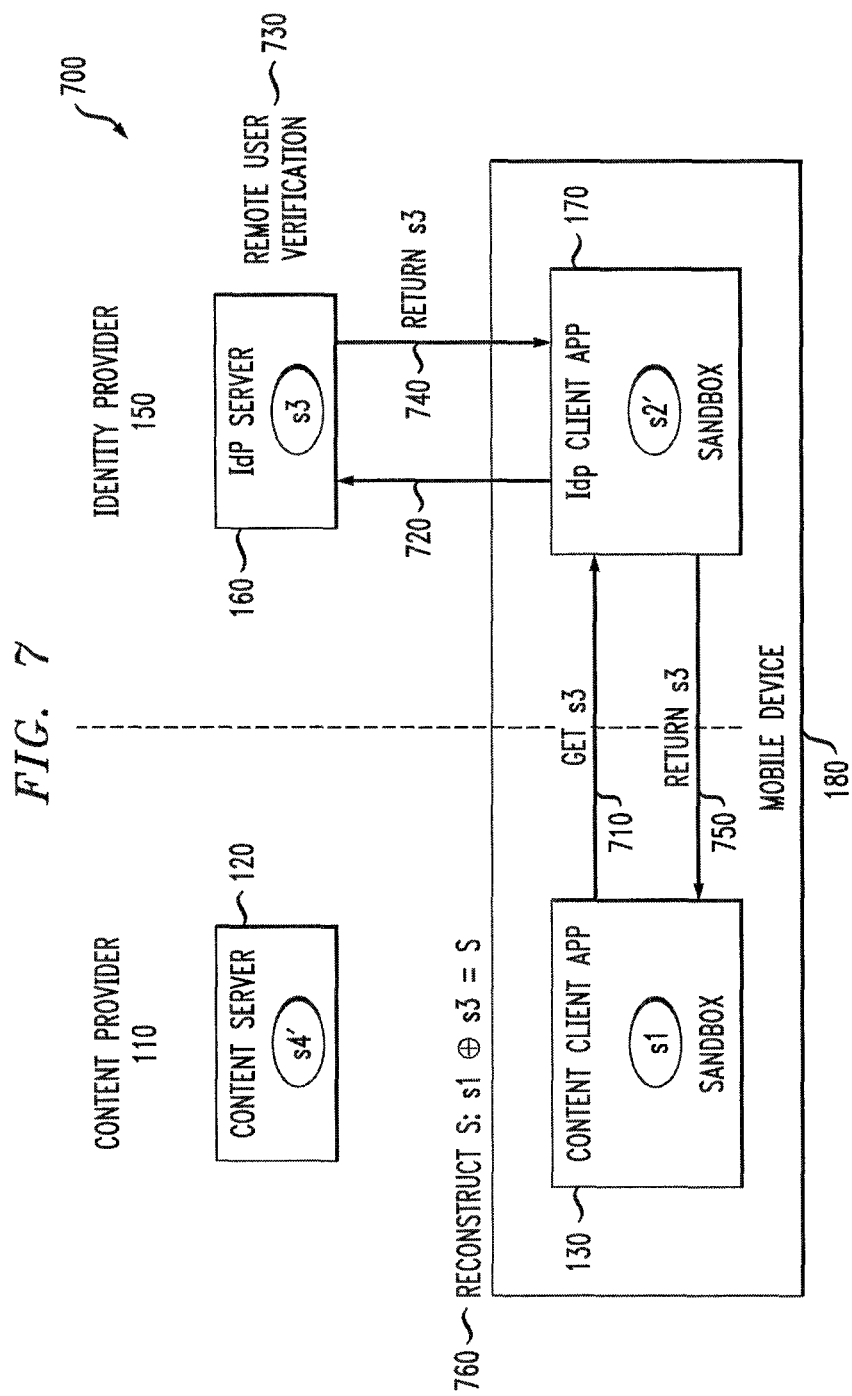

FIG. 7 illustrates an online process 700 for reconstructing the secret, S, using shares [s1, s3], where s3 is obtained from the IdP Server 160 following a remote verification of the user. As shown in FIG. 7, the Content Client app 130 initially sends a request to the IdP Client app 170 during step 710 to obtain s3. The IdP Client app 170 then redirects the request to the IdP Server 160 during step 720. The IdP Server 160 performs a remote user verification during step 730. Once the user is verified, the IdP Server 160 returns the share s3 to the IdP Client app 170 during step 740. The IdP Client app 170 returns s3 to the Content Client app 130 during step 750. The Content Client app 130 then reconstructs S during step 760 (s1⊕s3=S). In a further variation, the IdP Client app 170 returns s2' to the Content Client app 130 during step 750 and the Content Client app 130 then reconstructs S during step 760 (s1⊕s2'=S).

According to a further aspect of the invention, at least one distributed share in the modified set of shares s1, s2', s3 and s4' stored by modules 120, 130, 160, 170, such as share s2', is protected with user credentials. In one exemplary embodiment, s1 can be stored on the device 180 protected within the application sandbox of the content client app 130 by leveraging the native protection mechanisms of the platform, such as Keychain in iOS; s4' is stored in the Content Server 120 database or file system using standard encryption methods, such as database encryption, using a key protected in an encrypted software KeyStore or a hardware security module (HSM) (access to s4' must be authenticated, for example, using SSL client certificate authentication before access to s4' is authorized—the content client app 130 must prove its identity and authenticity to the content server 120 before accessing s4'); s2' is stored by the IdP Client app 170 and can be encrypted using a key derived from the entropy provided by user authentication method (s2' can optionally be further encrypted in storage by leveraging the encrypted stores of the platform, such as Keychain in iOS); and s3 is stored in the IdP Server 160 using standard encryption method, such as database encryption, under a key protected in a software KeyStore or an HSM (access to s3 must be authenticated, for example, using SSL client certificate authentication techniques—the IdP client app 170 must prove its identity and authenticity to the IdP Server 160 before accessing s3).

In the event s1 and/or s2' are lost (for example as a result of wiping all the data of the Content Client app 130, uninstalling and then reinstalling Content Client app 130, or wiping all data on device 180), [s3, s4'] pair will be used to restore the secret, S. The device 180 must be online to perform secret share recovery.

Figure 8:
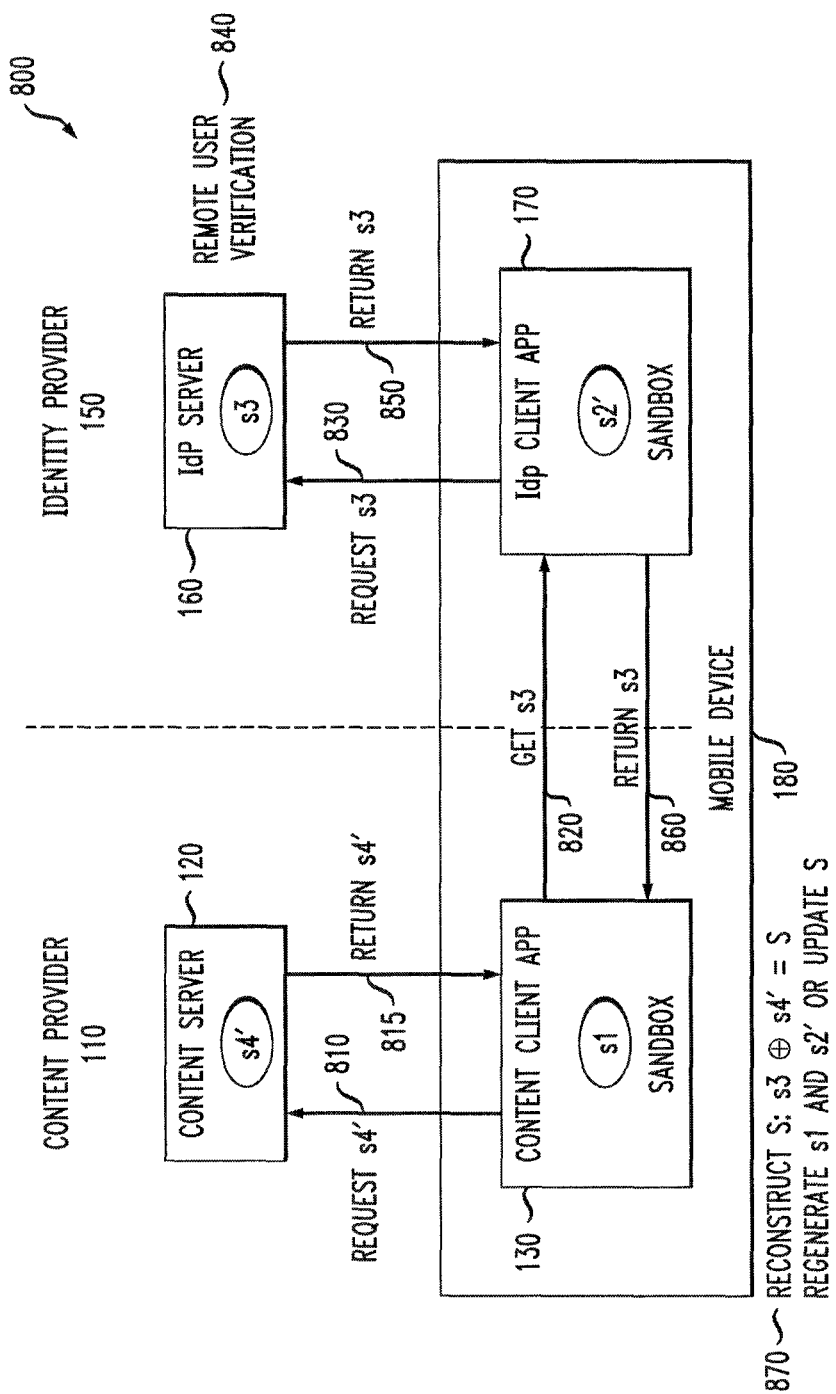
FIG. 8 illustrates an exemplary online process for recovering one or more lost shares.

FIG. 8 illustrates an exemplary online process 800 for recovering one or more lost shares (e.g., s1 and/or s2' using shares [s3, s4']). As shown in FIG. 8, the Content Client app 130 requests the share s4' from Content Server 120 during step 810 and the Content Server 120 returns s4' during step 815. The Content Client app 130 also requests the IdP Client app 170 to obtain s3 during step 820. The IdP Client app 170 then redirects the request to the IdP Server 160 during step 830. The IdP Server 160 performs a remote user verification during step 840. Once the user is verified, the IdP Server 160 returns the share s3 to the IdP Client app 170 during step 850. The IdP Client app 170 returns s3 to the Content Client app 130 during step 860. The Content Client app 130 then reconstructs S during step 870 (s3⊕s4'=S) and then regenerates s1 and s2' from S or updates S.

Once S is restored, it may be used first to decrypt and restore content that is encrypted under S (e.g., content that is backed up in the cloud) and then either replace S with a new secret, S' and generate four new shares from S, or continue to use S for content protection and create two new shares from S to replace the lost shares s1 and s2'.

In one exemplary implementation, a policy is employed whereby [s1, s2'] pair will only be used to reconstruct the secret, S, when the device 180 is offline, and [s4', s3] pair will be used to reconstruct the secret, S, when the device 180 is in online mode, as well as for recovery purposes.

In an implementation where only the Content Client app 130 can reconstruct the secret, S, the reconstruction or recovery process for S is initiated by the Content Client app 130. In a more general case and under other conditions, it is possible to allow the message flow to be initiated by a different component 120, 160, 170 in the system 100, or the secret, S, to be reconstructed by another component 120, 160, 170 and transferred to the Content Client app 130 for content decryption. For example, the content server 120 may reconstruct the secret, S, and sends it to the Content Client app 130 to decrypt encrypted content that is stored offline. Alternatively, in a configuration where the Identity Provider (IdP) 150 is responsible for the generation and reconstruction of the secret, S, the distribution and access control rules will be defined accordingly using a similar hybrid secret sharing and wrapping technique.

In a further variation that implements different access controls when the device 180 is online and when the device 180 is offline, the secret, S, may be split into five different shares in such a way that at least three shares out of the five shares are needed to produce S. The fifth share will be used for recovery purposes only when the device's stored shares are lost. The recovery share can be protected in a dedicated recovery service. For the sake of example, the recovery share is assumed to be part of the IdP domain, however, the recovery could be part of the content provider or managed by a third party service provider. The five shares in this case will be wrapped and distributed as follows:

Content Server 120 stores $S_4''=E(S_3, S_4)$;
Content Client app 130 stores $S_1$ and $S_4'=E(S_2, S_4)$;
IdP Server 160 stores $S_3$ and $S_5'=E(S_3, S_5)$; and
IdP Client app 170 stores $S_2'=E(S_1, S_2)$.

When in an offline mode, the Content Client app 130 requests $S_2'$ from the IdP Client app 170 and then uses the stored $S_1$ to unwrap $S_2$ and then uses $S_2$ to unwrap $S_4$ in $S_4'$.

When in an online mode, the Content Client app 130 requests $S_4''$ from the Content Server 120 and $S_3$ from the IdP Server 160 via the IdP Client app 170, then uses $S_3$ to unwrap $S_4$ in $S_4''$.

When the secret shares on the device 180 are lost, the Content Client app 130 recovers secret, S, by first requesting $S_4''$ from the Content Server 120 and requesting $S_3$ and $S_5'$ from the IdP Server 160. The Content Client app 130 uses $S_3$ to get $S_5$ and $S_4$, then uses $S_3$, $S_4$ and $S_5$ to reproduce S and recover any backed up content under S. The Content Client app 130 may generate a new secret, S' to replace S or generate new shares from S to replace lost shares $S_1$ and $S_2$.

A slight variation of this distribution is to have the recovery share $S_5$ wrapped under $S_3$ and stored in a secondary user device, such as another mobile phone, a Wearable device, a Secure Digital (SD) card, or some other hardware form factor. The secondary user device will be bound with the primary mobile device and used only for recovery purposes of the secret, S.

If a Secure Element (SE) or a Trusted Execution Environment (TEE) is available, they can be employed for added protection, as would be apparent to a person of ordinary skill in the art.

Figure 9:
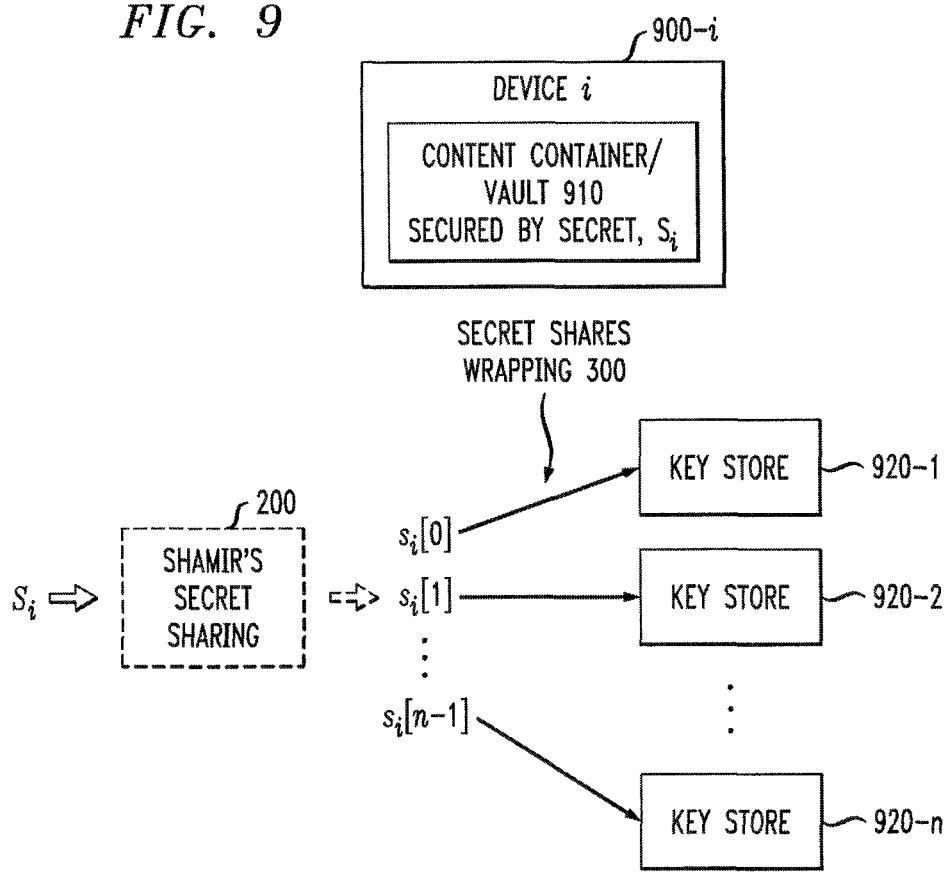
FIG. 9 illustrates an exemplary key management framework that incorporates aspects of the present invention for protecting a content container or vault on one or more devices.

FIG. 9 illustrates an exemplary key management framework for protecting a content container or vault 910 on one or more devices **900-*i* that incorporates aspects of the present invention. As shown in FIG. 9, the secret, $S_i$, is a key used to encrypt the container/vault 910 belonging to a user. By applying a secret sharing scheme 200** (e.g., Shamir's secret sharing scheme or any other existing secret sharing scheme, as discussed above) to the secret, $S_i$, the exemplary framework decomposes the secret, $S_i$, into a set of n shares, $s_i [0]$ through $s_i[n-1]$.

The exemplary framework of FIG. 9 is optionally augmented with a key-wrapping 300 of the secret shares $s_i [0]$ through $s_i[n-1]$, such that one or more secret shares $s_i[t]$, $0<=t<n$, can be "wrapped" by another one or more shares $s_i[t']$, $0<=t'<n$. In other words, the former share ($s_i[t]$) is encrypted using an appropriate secure encryption scheme (e.g., a semantically secure encryption scheme) using as a secret key the latter share ($s_i[t']$), so that the former share is only stored in a corresponding key store 920-1 through **920-*n*** in an encrypted (or wrapped) form. More elaborate key-wrapping techniques can be also used where, for instance, a key share can be encrypted by a subset of other secret shares so that all these secret shares in conjunction are needed in order to decrypt the wrapped share. This key-wrapping methodology allows for two important advantageous features to provide increased flexibility and security of the framework.

First, the key wrapping augments or refines the underlying access structure for secret reconstruction to include additional dependence relations among shares. Effectively, the policy is augmented to enforce a series of additional possessions of secret shares for reconstruction of the master secret: these additional shares, when used in conjunction to unwrap other secret shares, correspond to more refined (stricter) preconditions in terms of allowance of secret reconstruction.

Second, the key wrapping enriches one or more corresponding key-release policies of individual shares to include key-release conditions that are based on possession of other secret shares or to include key-release conditions of wrapped shares that are based on possession of other authentication credentials. That is, effectively, some required authentication credential released by an authentication device can be equated to be another secret share, that is, some authentication device is equated to be a key store, or some key store can be equated to be a wrapped share. This provides extra degrees of freedom in defining elaborate key-release policies.

Key-wrapping as described herein can be done with more than one secret share. Secret shares can be wrapped with a plurality of other secret shares, and secret shares can be wrapped with an intersecting set of similar shares. For example, one secret share can be wrapped with two different shares, two different shares can be wrapped with the same third share, and one share can be wrapped with a second share, and the resulting secret is wrapped with a third share (nested). Thus, many different orderings/combinations of shares can be enforced through key wrapping, beyond just wrapping one share with another share.

Shares themselves may be stored in multiple locations, and each secret share store may enforce a different key-release policy. In addition to the cryptographic constraints imposed by the wrapped shares, policy constraints may be applied as well and can be orchestrated to enforce a complex access policy, combining two different types of protections (policy and cryptography).

Among other benefits, aspects of the invention do not allow the Identity Provider (IdP) 150 to access or produce the full secret key, S. Rather, only the content provider 110 has access to the secret key S and hence to the protected content and resources. In addition, the secret key, S, cannot be produced if one app on the device 180 is attacked and the other app is not attacked. The required shares are protected in two different application sandboxes. Unless the device is rooted, one app (or any other app on the device 180) cannot access a share that is protected by another app.

Further, aspects of the invention do not require a transfer of the full secret key between the two apps on the device 180 using unsecure mobile inter-process communication channels. Lost shares can also be replaced without replacing the original secret under which the content is protected. Lost shares can be revoked by replacing the old secret with a new secret and generating new secret shares from the new secret. Proactive secret sharing techniques may optionally be employed so that new fresh shares are produced that are consistent with the same underlying secret they reconstruct.

Secret sharing is information theoretically secure. Even if encryption were to break, the secret sharing still hold and provides extra security.

CONCLUSION

The foregoing applications and associated embodiments should be considered as illustrative only, and numerous other embodiments can be configured using the techniques disclosed herein, in a wide variety of different cryptography applications.

It should be understood that the hybrid secret sharing techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The embodiments described herein can provide a number of significant advantages relative to conventional practice. For example, these embodiments can advantageously provide improved protection of stored keys and the content protected by such stored keys.

Authentication processes in other embodiments may make use of one or more operations commonly used in the context of conventional authentication processes. Examples of conventional authentication processes are disclosed in A. J. Menezes et al., Handbook of Applied Cryptography, CRC Press, 1997, which is incorporated by reference herein. These conventional processes, being well known to those skilled in the art, will not be described in further detail herein, although embodiments of the present invention may incorporate aspects of such processes.

The communication system may be implemented using one or more processing platforms. One or more of the processing modules or other components may therefore each run on a computer, storage device or other processing platform element. A given such element may be viewed as an example of what is more generally referred to herein as a "processing device."

Figure 10:
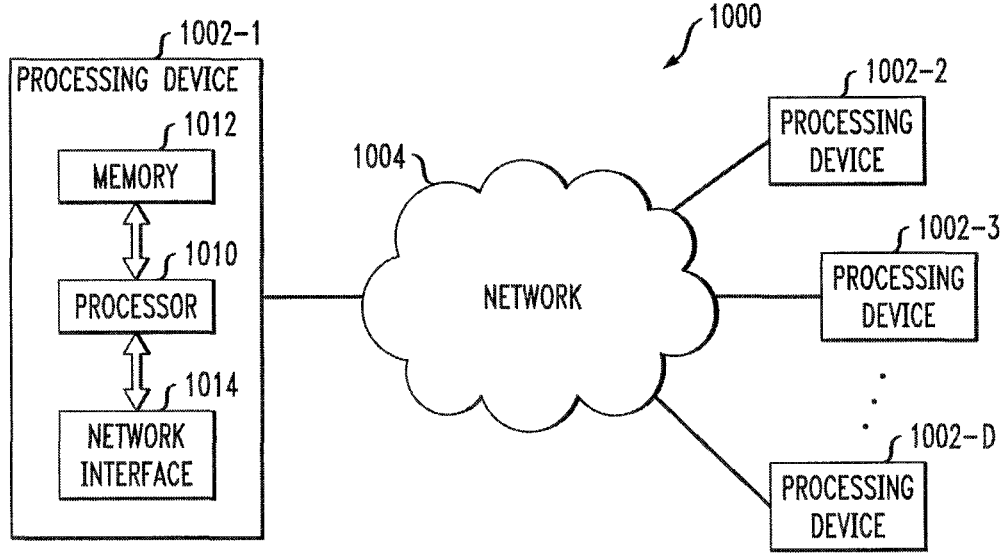
FIG. 10 illustrates another exemplary processing platform that may be used to implement at least a portion of one or more embodiments of the invention.

An exemplary processing platform 1000 shown in FIG. 10. The processing platform 1000 in this embodiment comprises at least a portion of the given system and includes a plurality of processing devices, denoted 1002-1, 1002-2, 1002-3, . . . 1002-D, which communicate with one another over a network 1004. The network 1004 may comprise any type of network, such as a WAN, a LAN, a satellite network, a telephone or cable network, a cellular network, a wireless network such as Bluetooth, NFC, WiFi or WiMAX, or various portions or combinations of these and other types of networks.

The processing device 1002-1 in the processing platform 1000 comprises a processor 1010 coupled to a memory 1012. The processor 1010 may comprise a microprocessor, a microcontroller, an ASIC, an FPGA or other type of processing circuitry, as well as portions or combinations of such circuitry elements, and the memory 1012, which may be viewed as an example of a "computer program product" having executable computer program code embodied therein, may comprise RAM, ROM or other types of memory, in any combination.

Also included in the processing device 1002-1 is network interface circuitry 1014, which is used to interface the processing device with the network 1004 and other system components, and may comprise conventional transceivers.

The other processing devices 1002 of the processing platform 1000 are assumed to be configured in a manner similar to that shown for processing device 1002-1 in the figure.

Again, the particular processing platform 1000 shown in the figure is presented by way of example only, and the given system may include additional or alternative processing platforms, as well as numerous distinct processing platforms in any combination, with each such platform comprising one or more computers, storage devices or other processing devices.

Multiple elements of system may be collectively implemented on a common processing platform of the type shown in FIG. 10, or each such element may be implemented on a separate processing platform.

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a tangible recordable medium (e.g., floppy disks, hard drives, compact disks, memory cards, semiconductor devices, chips, application specific integrated circuits (ASICs)) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

It should again be emphasized that the above-described embodiments of the invention are presented for purposes of illustration only. Many variations and other alternative embodiments may be used. For example, the techniques are applicable to a wide variety of other types of cryptographic devices and authentication systems that can benefit from distributed cryptography using distinct value sets as disclosed herein. Also, the particular configuration of communication system and processing device elements shown herein, and the associated authentication techniques, can be varied in other embodiments. Moreover, the various simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method, comprising:
   obtaining a secret that protects at least one data item;
   applying a secret splitting scheme to said secret to obtain a plurality of secret shares of said secret;
   encrypting at least one of said plurality of secret shares of said secret to provide at least one encrypted secret share using an encryption scheme that uses at least one other of said plurality of secret shares of said secret as an encryption key, wherein a subset of said plurality of secret shares and said at least one encrypted secret share is required to reconstruct said secret; and
   providing one or more of said plurality of secret shares of said secret and said at least one encrypted secret share to at least one device to allow access to said at least one data item secured by said secret.

2. The method of claim 1, wherein said at least one encrypted secret share is provided only in encrypted form.

3. The method of claim 1, wherein said secret splitting scheme comprises Shamir's polynomial secret sharing scheme.

4. The method of claim 1, wherein at least one of said provided one or more of said plurality of secret shares and said at least one encrypted secret share is protected with user credentials.

5. The method of claim 1, wherein said secret comprises a key used to protect one or more of a content container and a vault storing one or more protected data items.

6. The method of claim 1, wherein said provided one or more of said plurality of secret shares and said at least one encrypted secret share are stored in one or more key stores on one or more different devices.

7. The method of claim 1, wherein one or more of said secret shares and said at least one encrypted secret share are released based on a corresponding key-release policy.

8. The method of claim 1, wherein said secret comprises a secret key used to protect at least one content item.

9. The method of claim 8, wherein said step of providing one or more of said plurality of secret shares and said at least one encrypted secret share provides one of said plurality of secret shares and said at least one encrypted secret share to a corresponding one of a Content Provider server, an Identity Provider server, a Content Provider application executing on a user device and an Identity Provider application executing on said user device.

10. The method of claim 9, wherein said secret is reconstructed by an offline process on said user device using (i) one of said plurality of secret shares stored by a first one of said Content Provider application and said Identity Provider application and (ii) said at least one encrypted secret share stored by a second one of said Content Provider application and said Identity Provider application.

11. The method of claim 9, wherein said secret is reconstructed by an online process using one of said plurality of secret shares stored by said Identity Provider server following a verification of a user of said user device.

12. The method of claim 9, wherein said secret is reconstructed by an online process using one or more of said plurality of secret shares and said at least one encrypted secret share stored by said identity Provider application following a verification of a user of said user device by said Identity Provider server.

13. The method of claim 9, wherein one or more of said secret one or more of said plurality of secret shares and said at least one encrypted secret share are recovered by said user device using (i) one of said plurality of secret shares stored by a first one of said Content Provider server and said Identity Provider server and (ii) said at least one encrypted secret share stored by a second one of said Content Provider server and said identity Provider server following a verification of a user of said user device.

14. The method of claim 1, wherein at least one of said plurality of secret shares comprises a dedicated share for a recovery process.

15. The method of claim 1, wherein said step of encrypting said at least one of said plurality of secret shares using said at least one other of said plurality of secret shares as the encryption key further comprises one or more of (i) encrypting said at least one of said plurality of secret shares with a plurality of other secret shares, encrypting two of said plurality of secret shares with a third of said secret shares, and (iii) encrypting, a first secret share with a second secret share to generate a resulting secret share and encrypting said resulting secret share with a third of said secret shares.

16. An apparatus comprising:
a memory; and
at least one hardware device, coupled to the memory, operative to implement the following steps:
obtaining a secret that protects at least one data item;
applying a secret splitting scheme to said secret to obtain a plurality of secret shares of said secret;
encrypting at least one of said plurality of secret shares of said secret to provide at least one encrypted secret share using an encryption scheme that uses at least one other of said plurality of secret shares of said secret as the encryption key, wherein a subset of said plurality of secret shares and said at least one encrypted secret share is required to reconstruct said secret; and
providing one or more of said plurality of secret shares of said secret and said at least one encrypted secret share to at least one device to allow access to said at least one data item secured by said secret, S.

17. The apparatus of claim 16, wherein said secret comprises a key used to protect one or more of a content container and a vault storing one or more protected data items.

18. The apparatus of claim 16, wherein said provided one or more of said plurality of secret shares and said at least one encrypted secret share are stored in one or more key stores on one or more different devices.

19. The apparatus of claim 16, wherein said secret comprises a secret key used to protect at least one content item.

20. The apparatus of claim 19, wherein said step of providing one or more of said plurality of secret shares and said at least one encrypted secret share provides one of said plurality of secret shares and said at least one encrypted secret share to a corresponding one of a Content Provider server, an Identity Provider server, a Content Provider application executing on a user device and an identity Provider application executing on said user device.

21. The apparatus of claim 20, wherein said secret is reconstructed by an offline process on said user device using (i) one of said plurality of secret shares stored by a first one of said Content Provider application and said Identity Provider application and (ii) said at least one encrypted secret share stored by a second one of said Content Provider application and said Identity Provider application.

22. The apparatus of claim 20, wherein said secret is reconstructed by an online process using one of said plurality of secret shares stored by said identity Provider server following a verification of a user of said user device.

23. The apparatus of claim 20, wherein said secret is reconstructed by an online process using one or more of said plurality of secret shares and said at least one encrypted secret share stored by said Identity Provider application following a verification of a user of said user device by said Identity Provider server.

24. The apparatus of claim 20, wherein one or more of said secret one or more of said plurality of secret shares and said at least one encrypted secret share are recovered by said user device using (i) one of said plurality of secret shares stored by a first one of said Content Provider server and said Identity Provider server and (ii) said at least one encrypted secret share stored by a second one of said Content Provider server and said identity Provider server following a verification of a user of said user device.

25. An article of manufacture, comprising:
a non-transitory machine readable recordable storage medium containing one or more programs which when executed implement the steps of:
obtaining a secret that protects at least one data item;
applying a secret splitting scheme to said secret, to obtain a plurality of secret shares of said secret;
encrypting at least one of said plurality of secret shares of said secret to provide at least one encrypted secret share using an encryption scheme that uses at least one other of said plurality of secret shares of said secret as the encryption key, wherein a subset of said plurality of secret shares and said at least one encrypted secret share is required to reconstruct said secret; and
providing one or more of said plurality of secret shares of said secret and said at least one encrypted secret share to at least one device to allow access to said at least one data item secured by said secret.

\* \* \* \* \*

UNITED STATES PATENT AND TRADEMARK OFFICE
CERTIFICATE OF CORRECTION

| | | |
|---|---|---|
| PATENT NO. | : 9,461,821 B1 | Page 1 of 1 |
| APPLICATION NO. | : 14/319276 | |
| DATED | : October 4, 2016 | |
| INVENTOR(S) | : Machani et al. | |

It is certified that error appears in the above-identified patent and that said Letters Patent is hereby corrected as shown below:

In the Specification

In Column 3, Line 18, replace "embodiment a set of key" with --embodiment, a set of key--.

In Column 4, Line 5, replace "Share a Secret", Communications" with --Share a Secret," Communications--.

In Column 9, Line 2, replace "still hold and" with --still holds and--.

In Column 9, Line 43, replace "platform 1000 shown in" with --platform 1000 is shown in--.

Signed and Sealed this
Ninth Day of May, 2017

Michelle K. Lee
*Director of the United States Patent and Trademark Office*